Patented July 29, 1930

1,771,719

UNITED STATES PATENT OFFICE

FRIEDRICH WILHELM MEYER, OF WISMAR, MECKLENBURG, GERMANY

PROCESS OF REACTIVATING DECOLORIZING CARBON

No Drawing. Application filed September 14, 1929, Serial No. 392,736, and in Germany September 8, 1928.

This invention relates to a process of reactivating decolorizing carbon.

It is already known to reactivate decolorizing carbon by the action of superheated or saturated steam. These reactivation processes are based on the recognition that the coloring matters which have accumulated on the spent carbon can be destroyed at temperatures which are below the glowing temperature, that is to say below 450° C. Thus for example decolorizing carbon is reactivated if steam at 180° C. is passed therethrough for four hours or if steam at 300° C. is passed therethrough for one hour.

The aforementioned processes were however rendered useless in practice by the high consumption of steam they entail, particularly as the steam required for the reactivation and passed through the carbon could not be further utilized for other purposes since it is too highly charged with coloring matters and mucilaginous substances.

The present invention aims at obviating this drawback by subjecting the decolorizing carbon to be reactivated, to the action of the steam in a closed vessel wherein the steam is stationary.

It has moreover been ascertained that it is essential for the reactivation of the carbon at temperatures below the glowing temperature, that the carbon be kept moist at the commencement of the process.

When reactivating carbon in accordance with these principles, the carbon is heated in a moist state in a closed container or autoclave. The container is constructed so as to withstand pressure and is advantageously heated externally, either by saturated steam or by slightly superheated steam or even by combustion gases.

In general, it is advantageous to employ internal heating for the pressure vessel only for first warming the moist carbon, if at all.

It is moreover possible to moisten spent carbon introduced into the pressure vessel in a dry state, by passing saturated steam therethrough for a short period at the commencement of the process and thereupon to carry out the further treatment of the moist carbon in the manner hereinbefore set forth.

Example

There is employed for the reactivation a pressure vessel or autoclave which has been tested for an internal pressure of 20 atmospheres. The vessel is double walled and is provided with an upper charging opening which is capable of being closed gas tight by a lid carrying an air valve. At its lower end the vessel is provided with a valved conduit for the introduction of steam.

The carbon to be reactivated may be pretreated with acid or lye and in the case of a treatment with acid must be carefully washed in order to prevent the walls of the vessel being attacked by acid. It is thereupon charged into the pressure vessel and steam is led into the interior of the vessel while the air valve is kept open until the air has escaped. Immediately after the air valve has been closed the jacket of the vessel is filled with steam at a pressure of 20 atmospheres. As the pressure vessel is capable of withstanding 20 atmospheres pressure temperatures of 200° C. may be employed therein without risk. The reactivation process is terminated within 3 to 5 hours.

If the carbon contained sufficient water, for example, if it was originally in the form of a paste, then it remains moist for the entire duration of the treatment and the internal unoccupied space of the vessel is filled with saturated steam. If, however, the carbon was moistened only to such an extent that its water-content evaporated before it attained the maximum temperature, then during the course of the process the carbon dries out and the interior of the vessel is filled with superheated steam.

The pressure vessel may also be heated directly by combustion gases or by other suitable heating means, instead of by steam.

The temperature must be kept sufficiently high to ensure the decomposition of the organic substances accumulated on the carbon. Moreover the process proceeds more rapidly the higher the temperature is maintained. Thus for example at a temperature of 140° C.

the process takes more than 12 hours. A temperature between 180° and 300° C. is generally the most economical. The critical temperature of the steam constitutes the upper limit.

In order to free the carbon from substances which have been rendered soluble by the reactivation process, it is subsequently advantageously washed with water in the filter.

The pressure vessel may simultaneously be employed for conveying the carbon to the filter. In this case the carbon is converted into the form of a sludge if it is not already in this state and is conveyed from the vessel which acts similarly to a steam or compressed air lift. For this purpose the pressure vessel is provided with a lower outlet opening which communicates through a conduit with the filter.

What I claim is:—

1. A process of reactivating spent decolorizing carbon, which comprises moistening said carbon and subjecting said carbon in a moist condition at a temperature between 180° C.—300° C. to the action of steam within a closed vessel.

2. A process of reactivating spent decolorizing carbon, which comprises subjecting said carbon in a moist condition at a temperature of between 140° C. and 450° C. to the action of steam within a closed vessel.

3. A process of activating spent decolorizing carbon which comprises moistening said carbon and warming said moistened carbon within a pressure vessel by means of flowing steam, expelling the air from said vessel, closing said vessel, and subjecting said carbon to the action of steam within said pressure vessel at a temperature above 140° C. and below 450° C.

In testimony whereof, I have signed my name to this specification at Hamburg, Germany, this 29th day of August, 1929.

FRIEDRICH WILHELM MEYER.